United States Patent Office 3,539,548
Patented Nov. 10, 1970

3,539,548
PRODUCTION OF ISOCROTONIC ACID
Martin B. Hocking, Sarnia, Ontario, Canada, assignor to The Dow Chemical Company, Midland, Mich., a corporation of Delaware
No Drawing. Filed Feb. 7, 1968, Ser. No. 703,558
Int. Cl. C07c *57/00, 57/08*
U.S. Cl. 260—526    4 Claims

ABSTRACT OF THE DISCLOSURE

Isocrotonic acid is produced by concurrent thermal isomerization of crotonic acid and distillation under defined conditions. Continuous operation is provided by feeding fresh crotonic acid to the isomerizing mixture at about the rate at which isocrotonic acid is separated by distillation.

BACKGROUND OF THE INVENTION

The present invention concerns a new chemical process whereby crotonic acid is thermally isomerized to isocrotonic acid and the latter compound is distilled from the isomerizing mixture. The invention particularly relates to such a process operated on a continuous basis.

Crotonic acid and isocrotonic acid are the trans and cis geometric isomers respectively of 2-butenoic acid. They are principally useful as chemical intermediates for making resins and biologically active derivatives. Since these acids and their derivatives have somewhat different properties because of the difference in their structural orientation, it is desirable to have both acids conveniently available.

Although crotonic acid is an item of commerce, isocrotonic acid is far less easily available. It has been made in the past by various complicated procedures, usually involving fractional crystallization of mixed salts to separate isocrotonic acid from its isomer. It is known that crotonic acid can be isomerized by heating to obtain an equilibrium mixture of the two acids. However, separation of the isomers by distillation has heretofore been impractical because of isomerization taking place within the distillation column itself, resulting in a mixed distillate. Distillation of isocrotonic acid has been accomplished previously only under high vacuum with small quantities of acid.

SUMMARY OF THE INVENTION

A successful process has now been devised whereby crotonic acid can be thermally isomerized and the isomeric isocrotonic acid distilled from the mixture substantially as it is formed by controlling the conditions within the carefully defined limits. This new process comprises heating crotonic acid at 120–170° C. until the isomerized mixture thereby produced contains a significant proportion of isocrotonic acid, preferably at least about four percent by weight, and distilling isocrotonic acid from the isomerized mixture at an absolute pressure of 50–600 mm. Hg using a distillation column of at least about ten theoretical plates efficiency while maintaining in the mixture a concentration of isocrotonic acid of at least about four percent by weight. Under these conditions, a distillate of isocrotonic acid of up to 95 percent purity can be obtained at a reasonably practical rate. The process is preferably run as a continuous process by adding crotonic acid to the isomerizing mixture at approximately the rate at which isocrotonic acid is separated from it by distillation.

DETAILED DESCRIPTION

By carrying out the distillation at an absolute pressure of 50–600 mm. in the system, the pot temperature is maintained at about 120–170° C. Best results are obtained at a pressure of about 200–500 mm. with a corresponding pot temperature of about 130–165° C.

The rate of isomerization can be increased to some extent by adding a catalytic quantity of a substantially non-volatile strong acid to the crotonic acid in the pot. Any known acid esterification catalyst which is substantially non-volatile under process conditions can be used. Such acids include phosphoric acid, sulfuric acid, toluenesulfonic acid, and benzenedisulfonic acid.

When the distillation is carried out at pressure and temperature conditions as defined, the vapor temperature of the isocrotonic acid is maintained below about 155° C., preferably below 145° C. The difference between isomerization rates at vapor and pot temperatures then permits separation by distillation of reasonably pure isocrotonic acid, given an efficient distillation column and a sufficiently high ratio of reflux to distillate take-off to maintain a minimum isocrotonic acid concentration in the pot as specified. A column of at least ten and preferably at least fifteen theoretical plates efficiency is required.

The isocrotonic acid product of this process is of sufficiently high purity for many purposes. Isocrotonic acid essentially free of crotonic acid can be obtained if desired by high vacuum, low temperature redistillation of the product.

EXAMPLE

Three kilograms of crotonic acid was slowly distilled at slightly reduced pressure (456 mm. Hg) using a 90 x 2.5 cm. glass fractionation column packed with glass helices and equipped with an adjustable fractionating head whereby the reflux-take-off ratio was varied as shown below. The column had a distillation efficiency of approximately 17 theoretical plates at a 25:1 reflux:take-off ratio. The pot temperature during the distillation was 155–162° C. and isocrotonic acid distillate was collected over a period of about 54 hours of continuous operation at vapor temperatures between 141 and 144° C. Distillate and pot samples were taken and analyzed for isocrotonic acid content at intervals.

| Fraction No. | Time, hrs. | Percent iso distillate | Reflux ratio | Percent iso in pot |
|---|---|---|---|---|
| 0 | 0 | | | 0 |
| 1 | 0.7 | 46.5 | 25:1 | |
| 2 | 1.3 | 20.5 | 25:1 | |
| 3 | 1.5 | 45 | 100:1 | |
| 4 | 6.5 | 82 | 100:1 | |
| 5 | 23.5 | 92.5 | 100:1 | 4.9 |
| 6 | 24.5 | 82 | 50:1 | |
| 7 | 53.8 | 76 | 50:1 | 5.1 |

It is seen that at a temperature of 155–162° C., the isomerization of crotonic acid to isocrotonic acid was too slow to maintain a sufficient concentration of isocrotonic acid in the pot at a reflux-take-off ratio of 25:1 as shown by the decline in isocrotonic acid concentration in the distillate. However, this temperature was sufficient at reflux ratios of 50:1 and 100:1 to maintain the isocrotonic acid concentration in the pot at about 5% with consequent higher concentrations in the distillate. The rate of reflux was approximately constant throughout the experiment, take-off rates being about 30 g./hr. at 25:1, 20 g./hr. at 50:1, and 12 g./hr. at 100:1.

Take-off rates can be maintained at a higher level when the pot temperature is increased by running the distillation at a somewhat higher pressure, isocrotonic acid concentrations in the distillate being similar to those shown above, given the same column efficiency.

I claim:
1. A process for obtaining essentially pure isocrotonic acid which comprises heating crotonic acid at 120–170°

C. until the isomerized mixture thereby produced contains a significant proportion of isocrotonic acid and distilling isocrotonic acid from the isomerized mixture at an absolute pressure of 50–600 mm. Hg through a distillation column of at least about 10 theoretical plates efficiency while maintaining a concentration of isocrotonic acid in the mixture of at least about 4 percent by weight.

2. The process of claim 1 wherein the distillation pressure is 200–500 mm. and the temperature is 130–165° C.

3. The process of claim 1 wherein crotonic acid is heated in the presence of a catalytic quantity of a substantially non-volatile strong acid.

4. A continuous process as described in claim 1 wherein crotonic acid is added to the isomerizing mixture at approximately the rate at which isocrotonic acid is separated from it by distillation.

References Cited

Chemical Abstracts, vol. 60 (1964), p. 13121d.

JAMES A. PATTEN, Primary Examiner

U.S. Cl. X.R.

203—91